United States Patent [19]

Flynn et al.

[11] Patent Number: 4,872,920
[45] Date of Patent: Oct. 10, 1989

[54] ASBESTOS REMOVAL METHOD AND SYSTEM

[76] Inventors: Tom S. Flynn, 10 Willow Ave., Larkspur, Calif. 94939; Joe L. de Figueiredo, 5431 Sacramento Ave., Richmond, Calif. 94804

[21] Appl. No.: 125,478

[22] Filed: Nov. 25, 1987

[51] Int. Cl.⁴ .............................................. B08B 5/04
[52] U.S. Cl. ...................................... 134/21; 134/26; 134/30; 15/320; 15/321
[58] Field of Search .............. 134/21, 30, 26; 15/320, 15/321

[56] References Cited

U.S. PATENT DOCUMENTS

| 2,832,086 | 4/1958 | Wells | 15/131 |
| 2,998,924 | 5/1961 | Schaeffer | 239/136 |
| 3,258,578 | 6/1966 | Ferris | 219/273 |
| 3,262,146 | 7/1966 | Hays | 134/21 |
| 3,485,671 | 12/1969 | Stephens | 134/21 |
| 4,158,575 | 6/1979 | Townsend | 134/6 |
| 4,626,291 | 12/1986 | Natale | 134/21 |
| 4,670,062 | 6/1987 | Lester | 134/21 |

Primary Examiner—H. M. S. Sneed
Assistant Examiner—Sharon T. Cohen

[57] ABSTRACT

A method for removing asbestos-containing materials from substrates including a nozzle assembly for directing streams of pressurized steam to penetrate asbestos-containing material sufficiently to loosen binders therein so that the material can be easily dislodged from the substrate by a second stream of higher pressure steam. The nozzle assembly also includes a suction device having an inlet opening arranged adjacent steam ejection nozzles to draw-in asbestos particles and fibers entrained by the steam directed onto the asbestos-containing materials.

10 Claims, 2 Drawing Sheets

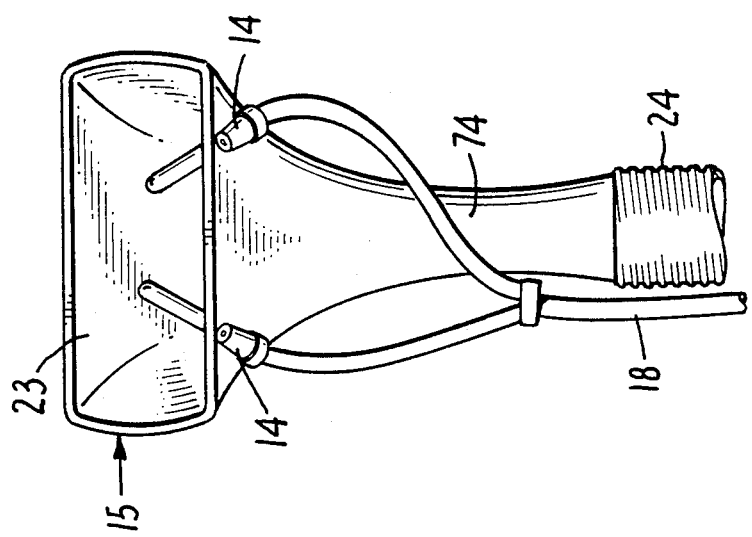
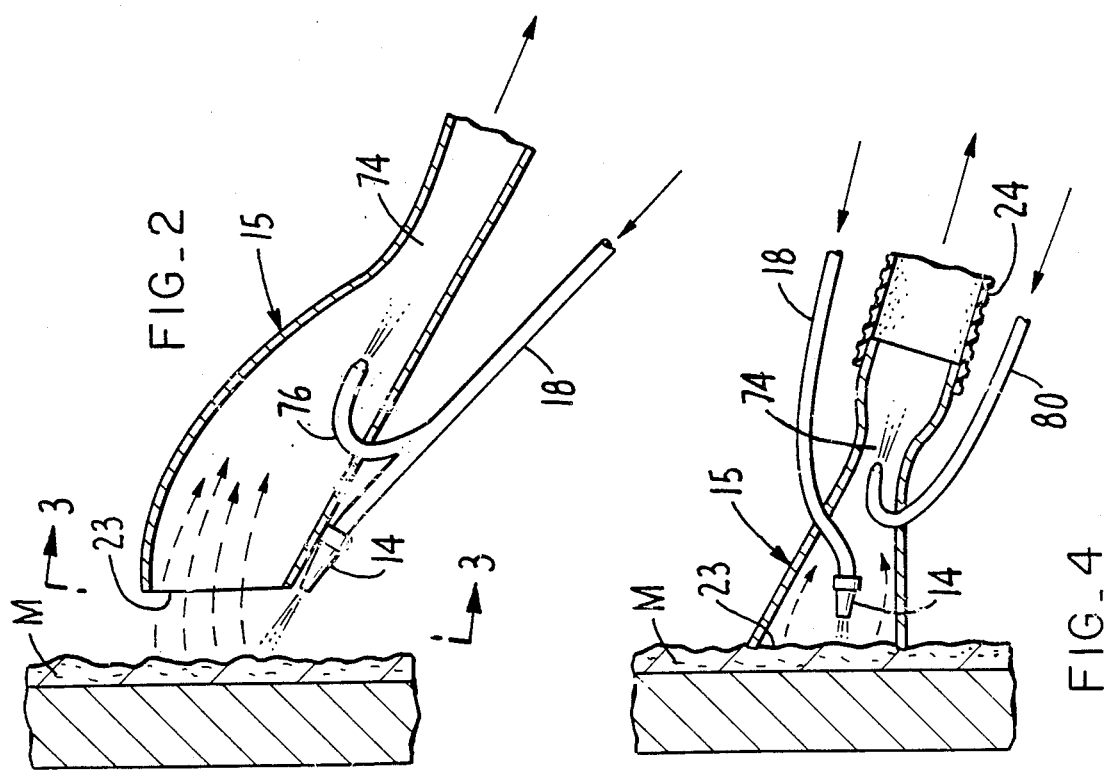

ASBESTOS REMOVAL METHOD AND SYSTEM

BACKGROUND OF THE INVENTION

1. Field of the Invention

The present invention generally relates to a system and method for removing asbestos-containing materials from buildings and, more particularly, the present invention relates to a system and method for removing asbestos-containing materials such as fireproofing and sprayed-on acoustical insulation.

2. State of the Art

Asbestos is a natural mineral whose extraordinary physical resistance to heat and chemicals has been recognized for centuries. In fact, the name asbestos comes from a Greek derivative which signifies that the mineral is durable and will not burn. Because of its fireproofing and thermal insulating properties, as well as its natural abundance in underground deposits, asbestos was a major component of building materials for a number of years, particularly between 1950 and 1974. During that period, thousands of tons of asbestos were sprayed into buildings to provide fireproofing and acoustical insulation. Also, asbestos was widely applied as thermal insulation for water pipes as well as heating and ventilating ducts. Typically in such instances, the asbestos-containing material is a composite dry mixture including asbestos fibers and particles. The mixture is held together by a glue-like binder which also bonds the material to a substrate such as metal and wooden decking, metal beams, plaster surfaces, and concrete pillars and beams.

By the early 1970's, accumulated medical information indicated that exposure to airborne asbestos could pose serious hazards to health. In particular, links were found between exposure to friable asbestos and diseases such as asbestosis, mesothelioma, and cancer of the lung. (Friable asbestos is material that is easily crumbled by hand pressure; it should be noted that asbestos-containing materials that are non-friable while in situ can become friable upon removal.) Because of the medical concerns, spraying of asbestos was banned in 1973 by the U.S. Environmental Protection Agency (EPA). Subsequently, most applications of asbestos in construction materials have been eliminated or are being phased out.

Due to the medical hazards of asbestos in existing structures, a range of corrective and mitigating measures have come into practice. The purpose of such measures is to protect the public, building occupants, maintenance persons, and personnel who could disturb asbestos materials during construction work. To alleviate risks of human exposure to airborne asbestos particles, current practice is to remove most forms of asbestos-containing materials whenever buildings are remodeled or renovated.

Procedures to remove asbestos from buildings usually encompass several key steps. Those steps include: (1) protecting workers in asbestos-containing areas by means of respirators, protective clothing and decontamination systems; (2) fully isolating asbestos-containing areas by means of sheet plastic that is sealed in place; (3) controlling ingress and egress to asbestos-containing work area by means of decontamination system; (4) minimizing airborne asbestos fiber concentrations in asbestos removal work areas by fully wetting asbestos-containing materials with water and penetration-aiding surfactants; (5) controlling and collecting wetted asbestos-containing materials while they are still wet, and depositing the collected materials in sealable bags; and (6) disposing of collected asbestos-containing waste materials at approved sites in a manner which avoids public exposure when the waste is transported and buried. Many of these procedures are set forth in EPA regulations (40 CFR, Part 61, Subparts A & B, 1973).

Normally, the initial step in removing asbestos-containing materials such as fireproofing and sprayed-on acoustical insulation is to repeatedly wet the materials to obtain maximum saturation. Two advantages of the use of water during asbestos removal include a reduction in airborne asbestos fiber concentrations and a reduction in the effort required to remove the asbestos-containing materials. That is, wet removal techniques are based on the tendency of water to reduce the release of the airborne asbestos fibers from asbestos-containing material and to increase the settling rate of fibers that are released. The positive effects of wet removal are sometimes further enhanced by adding a wetting agent to the water. Conventional wetting agents are combinations of chemicals that aid in the penetration of the asbestos-containing materials and increase the probability of individual fiber wetting. Various wetting agents are well known, and the EPA recommends a wetting agent consisting of 50% polyoxyethylene ester and 50% polyoxyethylene ether in a ratio of 1 ounce to 5 gallons of water.

After wetting, the typical next step in removing asbestos-containing materials from a substrate is to manually scrape the substrate by means of metal scrapers such as paint scrapers and tile removal scrapers. After gross removal of asbestos by scraping, residual asbestos-containing material is further cleaned or "detailed" from the substrate by scrubbing with brushes, scrub pads, sponges and rags. After cleaning of the substrate, the removed asbestos-containing materials are manually collected by means of shovels, squeegees, mops, or the like. Also, vacuums have been used to collect waste asbestos-containing materials from work sites.

At this juncture, it can be appreciated that asbestos removal from buildings is of substantial concern and is expensive, time consuming and potentially hazardous. The extent of the removal task may be appreciated from the fact that carcinogenic asbestos fibers have been used in the construction of more than 700,000 buildings throughout the U.S. Such asbestos was most often sprayed between floors, on steel girders, in wall panels and in other locations in which removal work is difficult or inconvenient.

Although asbestos removal is commonly performed by a manual scraping of a substrate as described above, it is known that faster removal can be achieved by forcefully directing high pressure water against an asbestos-containing material. Such procedures are sometimes referred to as hydroblasting and involve emitting water at high velocities and in relatively large quantities, e.g., 4–6 gal/min., to mechanically dislodge the asbestos from the substrate. One drawback of hydroblasting is that, in multi-floor work environments, considerable effort is required to collect and contain the water before it leaks to lower floors or causes water damage and electrical short-outs. Also, water leakage during hydroblasting operations can disperse contaminating particles. Further, after hydroblasting water is collected and contained, it must either be filtered or disposed of as hazardous waste. Therefore, hydroblasting is generally ill-suited to gross removal of asbestos but often is better limited to detailing work requiring usage of relatively limited quantities of water.

In view of the preceding discussion, it can be appreciated that there is a need to provide improved methods and systems for removing asbestos-containing materials from substrates.

OBJECTS, SUMMARY AND ADVANTAGES OF THE INVENTION

Generally speaking, an object of the present invention is to provide an improved method and system for removing asbestos-containing materials from substrates.

More particularly, an object of the present invention is to provide a method and system for removing asbestos-containing materials from substrates in a manner which reduces the required manual labor while increasing the safety of the public and workers by decreasing exposure time to dislodged asbestos particles and fibers.

In accordance with the preceding objects, the present invention generally provides a method for removing asbestos-containing materials from substrates by a procedure which includes the step of directing pressurized steam to penetrate asbestos-containing materials. Upon penetration, the heat and solvent properties of steam loosen the asbestos-containing materials, thereby facilitating their removal from substrates. In the preferred embodiment, the steam is directed from one or more nozzles which are integral with a suction device. The suction device functions to collect a substantial portion of the ejected steam which does not penetrate the asbestos-containing material. Also, the suction device operates to collect asbestos particles and fibers entrained in the ejected steam that has not penetrated the asbestos-containing material. Further in the preferred embodiment, a wetting agent is added to the ejected steam to aid in penetrating of the asbestos-containing material and binders.

Further, the present invention provides a system for rapidly removing asbestos-containing materials from substrates. Generally speaking, the system comprises a steam source and a suction means, both of which are connected to a manually-movable nozzle assembly. At the nozzle assembly, steam is controllably ejected to penetrate asbestos-containing materials and the glue-like binders in the materials. Also, at the nozzle assembly, the suction means draws-in steam and entrained asbestos particles and fibers generally immediately after they are loosened from an asbestos-containing material.

After consideration of the following detailed description, it will be appreciated that a primary advantage of the present invention is to provide a method and system that substantially reduces the manual labor and time required to remove asbestos-containing materials from substrates. Also, it will be appreciated that an advantage of the present invention is to provide a method and system for removing asbestos-containing materials from substrates in a manner that can reduce the extent of manual scraping and that places water in work areas in quantities substantially less than are employed in hydroblasting.

The foregoing and other objects and advantages will become apparent from the following detailed description and appended drawings of a preferred embodiment of the invention.

BRIEF DESCRIPTION OF THE DRAWINGS

In the drawings:

FIG. 2 is a cross-sectional view through one embodiment of a nozzle means for use with the system of FIG. 1;

FIG. 3 is a frontal elevation of a further embodiment of a nozzle means; and

FIG. 4 is a longitudinal sectional view through still another embodiment of a nozzle means.

DETAILED DESCRIPTION OF A PREFERRED EMBODIMENT OF THE INVENTION

Figure 1:
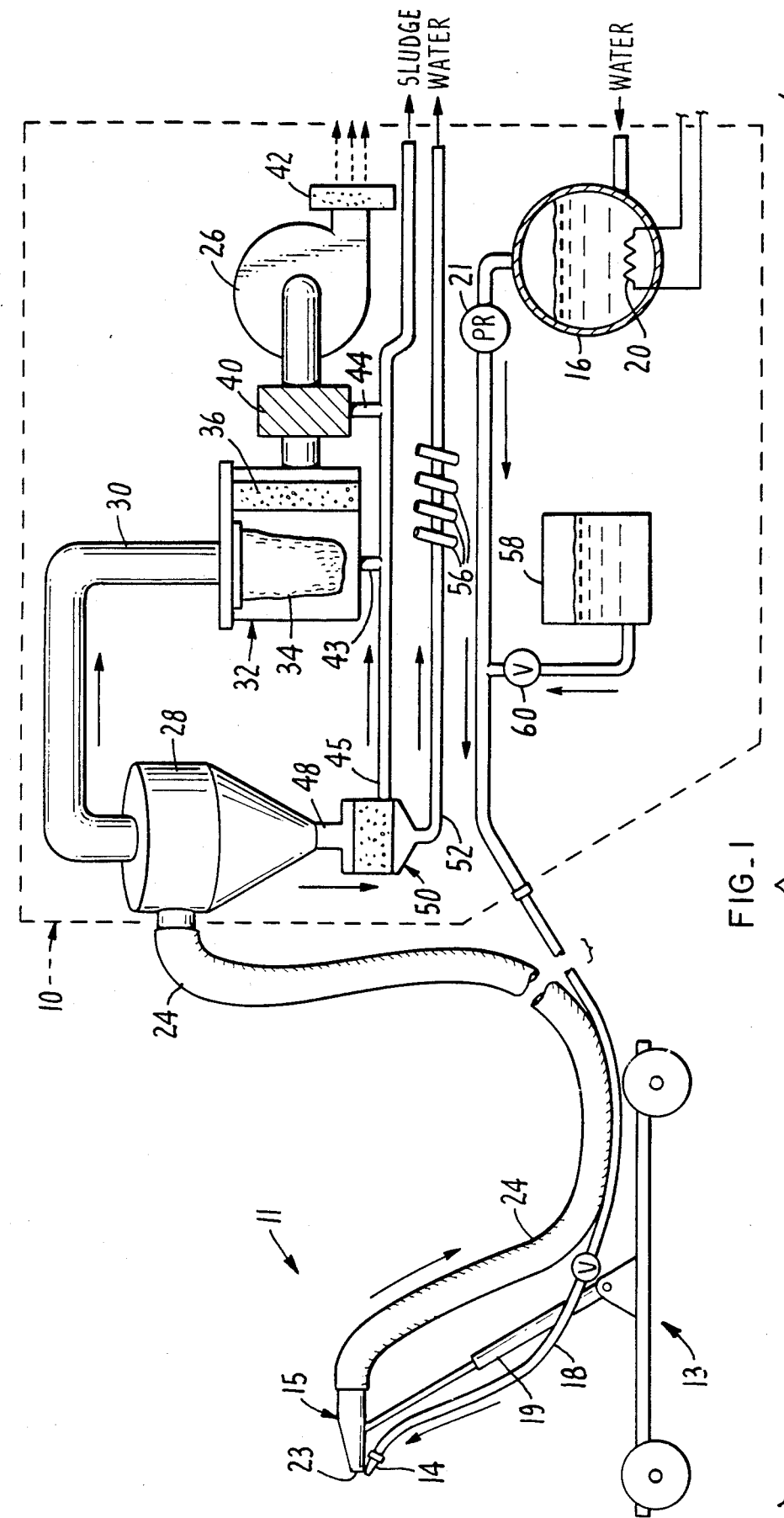
FIG. 1 is a schematic view, not drawn to scale, of an asbestos removal system according to the present invention.

As shown in FIG. 1, an asbestos removal system generally comprises a machine 10 connected to a manually movable nozzle assembly 11 which employs steam to penetrate and loosen asbestos-containing materials from substrates. As will be described further below, machine 10 includes a means to provide suction to collect at least a portion of the steam ejected from nozzle assembly 11 and means to separate any asbestos fibers and particles entrained in the steam. In practice, it is often desirable to provide a mobile cart 13 to support nozzle assembly 11. A pivotal, selectively-extendible boom 14 can be affixed to cart 10 to selectively position nozzle assembly 11.

In the preferred embodiment, nozzle assembly 11 includes one or more steam ejecting nozzles 14 mounted to a suction head 15. The nozzles 14 are connected by flexible tube 18 to carry steam from a boiler 16 within machine 10. The boiler heats water, preferably by electrical resistance heater 20, to produce steam. The pressure of steam provided to nozzles 14 can be adjustably controlled, or cutoff, by a pressure regulator 21 which is mounted in communication with tube 18.

As further shown in FIG. 1, suction head 15 includes an inlet opening 23 which connects to machine 10 by a flexible hose 24. Machine 10 carries a suction pump 26 and cyclone separator 28 connected to hose 24. In practice, the capacity of suction pump 26 is sufficient to draw a mixture of air, steam, water, and asbestos fibers and particles into suction head 15 and hose 24. Cyclone separator 28 is a conventional separation device and, in machine 10, functions to separate a gaseous stream of air and non-condensed steam from water and relatively heavy particles of asbestos-containing material. The gaseous stream, containing some entrained fine asbestos particles and fibers, exits cyclone separator 28 through upper outlet conduit 30 and is drawn into a first filter housing 32 by suction pump 26.

In first filter housing 32 in machine 10, the gaseous stream provided by conduit 30 is filtered by a bag-like fabric filter 34 and a filter panel 36. As a result of the filtration, a substantial fraction of the asbestos and other fine particles are removed from the gaseous stream. After separation of such particles, the gaseous stream normally still contains steam and some entrained fine water droplets and asbestos fibers and particles less than about ten microns in size. Consequently, it is usually desirable to provide a device 40 such as a drier containing dessicant or a heat exchanger to lower the temperature of the gaseous stream to remove the moisture from the gaseous stream. After the drier, the dried gas stream is passed through a HEPA (high efficiency particulate air) filter 42 prior to discharge from machine 10. Moisture collected in filter housing 32 and drier 42 can be drained by lines 43 and 44, respectively, into a sludge discharge line 45.

As also shown in FIG. 1, a slurry of water and heavier particles of the asbestos-containing material are discharged into a second filter chamber 50 from the bottom outlet 48 of cyclone separator 28. In filter chamber 50, the slurry is passed through a filter 52 which separates the water from the solid particles. The partially dewatered solid particles (i.e., sludge) are discharged from filter 50 via line 45. The filtrate (i.e., water) is carried from filter 50 via line 52. Prior to discharge from machine 10, the filtrate is passed through a series of cartridge filters 56 such as Tiel tubes which provide a final separation of fine particles and fibers from the filtrate.

To enhance steam penetration of asbestos-containing material, a wetting agent can be added to the steam. In FIG. 1, a wetting agent reservoir 58 is situated between the boiler 16 and the nozzle assembly 11. From reservoir 58, wetting agent is added to the flow of stream in tube 18 via valve 60. The wetting agent can be, for example, a liquid mixture of equal proportions of polyoxyethelene ester and polyoxyethylene ether.

As shown in FIGS. 2 through 4, suction head 15 can be of various shapes and sizes and can include venturi-like throat sections 7 disposed behind inlet opening 23. In each of the embodiments of FIGS. 2 through 4, it should be noted that steam ejection nozzles 14 are directed forwardly and at a slight inclination relative to inlet openings 23. As a result of this orientation of the steam nozzles 14, ejected steam which does not penetrate asbestos-containing material "M" will be deflected back toward inlet opening 23.

To intensify suction at inlet opening 23 of nozzle 15, some of the steam which flows through tube 18 can be diverted through take-off lines 76 and ejected rearwardly into the venturi-like throat sections 74. According to the modification shown in FIG. 4, a separate conduit 80 is employed for this purpose. Also in this modification, pressurized air, instead of steam, can be conducted through the conduit 80 into throat section 74. It should also be noted that one or more steam ejection nozzles 14 can extend into suction head 15 as depicted in FIG. 4. Also, the steam ejection nozzles 14 can be mounted interior of suction head 15 as shown in FIG. 3 rather than being mounted to the outside surface of the suction head as depicted in FIGS. 1 through 3.

In operation of the system as shown and described, the nozzle assembly 11 typically will be operated in asbestos containment areas where asbestos-containing material has been initially wetted with water without necessarily being saturated. A proper containment area can include, for example, barrier walls constructed with polyethylene plastic sheets joined with folded seams, and with sealing tape at the seams and boundaries. Also, a containment area will ordinarily employ air locks as well as negative air pressure systems and/or air filtration systems.

As nozzle assembly 11 is operated, one or more streams of pressurized steam are directed to penetrate an asbestos-containing material. To enhance the extent and depth of penetration, a wetting agent can be employed as previously described. The steam may be ejected as a continuous stream or as pulsating jets. Due to the heat and humidity of the ejected steam, the adhesives which bind the asbestos-containing material together and which bond the material to a substrate are quickly loosened so that the material can be removed from the substrate with little effort. It should be emphasized that the force of the steam is not necessarily used to dislodge the asbestos-containing material and that, normally, the steam pressure is less than employed in hydroblasting. However, by increasing the steam pressure, asbestos-containing materials can be dislodged. In practice, the pressure and quantity of ejected steam is adjusted depending upon the characteristics of the asbestos-containing material to be removed from a substrate. Although some ejected steam condenses into water, most of the water is absorbed by the asbestos-containing materials and the glue-like binders. In fact, the amount of water produced by the aforedescribed method and system is normally substantially less than the quantity of water produced by a comparable hydroblasting operation; for example, while hydroblasting may introduce 4–6 gpm of water into a containment area, the aforedescribed method may introduce only 1–2 gpm.

At all times while steam is ejected onto asbestos-containing material, vacuum is applied at suction head 15. The vacuum has several purposes. One purpose is to remove steam and mist so that workers can easily see the work surface. Another and even more important purpose is to draw in any asbestos particles or fibers which have been loosened by the ejected steam and which would otherwise become airborne within the containment area. It should be emphasized that the purpose of the suction is not to remove bulk asbestos-containing material from the work area. Thus, the level of the vacuum and the size of the inlet opening are selected for steam and mist removal, not for bulk material pick-up. If bulk asbestos is to be removed, a second vacuum machine can be provided that operates at more powerful vacuum levels.

Pressure regulator 21 is normally controlled so that steam is ejected from nozzles 14 only when the level of vacuum present a vacuum head 15 is adequate to prevent abnormally high concentrations of airborne asbestos in the containment area. As a consequence, the flow of steam is cutoff whenever there is a lack of vacuum. In the absence of the cutoff, the ejected steam could substantially increase the airborne fiber count in a containment area. In practice, vacuum levels are detected by conventional devices including pressure detectors. Also, pressure regulator 21 can be connected such that the ejection of steam is cutoff in the event of electrical power loss at suction pump 26.

Although the present invention has been described in its preferred embodiment, those skilled in the art will appreciate that additions, modifications, substitutions and deletions not specifically described in the preferred embodiment may be made without departing from the spirit and scope of the invention as defined in the appended claims. For example, it should be understood that the term "asbestos" is used in the foregoing to broadly include various types of materials including the serpentine and amphibole asbestos materials listed in Table I. It should be noted that such materials can include mineralogical species which are "non-fibrous" and other species which are "fibrous". The fibrous and non-fibrous species can be chemically identical, but the molecules in the fibrous form are arranged in long, thin strands which are relatively flexible. Although the non-fibrous species form plates or other non-flexible shapes, such shapes often can break into long thin needles which, for present purposes, are comprehended by the definition of asbestos.

TABLE 1

| SERPENTINE AND AMPHIBOLE ASBESTOS MATERIALS | |
| --- | --- |
| Fibrous Species | Corresponding Non-Fibrous Species |
| Chrysotile | Lizardite, antigoriate |
| Amosite | Cummingtonite-Grunerite |
| Crocidolite | Riebeckite |
| Fibrous Tremolite | Non-Fibrous Tremolite |
| Fibrous Anthophyllite | Non-Fibrous Anthophyllite |
| Fibrous Actinolite | Non-Fibrous Actinolite |

What is claimed is:

1. A method of removing bound asbestos-containing materials from substrates, comprising the steps of directing at least one stream of low pressure steam to penetrate asbestos-containing material sufficiently to loosen binders therein so that the material can be easily dislodged from a substrate, and directing a controlled stream of higher pressure steam against the asbestos-containing material for dislodging the same from the substrate.

2. A method according to claim 1 including the step of adding a wetting agent to at least one stream of pressurized steam to assist in penetrating the asbestos-containing material.

3. A method according to claim 2 wherein the wetting agent includes polyoxyethylene ester and polyoxyethylene ether.

4. A method according to claim 1 wherein said directing step includes directing pressurized steam from a nozzle.

5. A method according to claim 4 further including the step of arranging a suction means adjacent the nozzle to draw-in asbestos particles and fibers entrained by the steam directed onto the asbestos-containing material.

6. A method according to claim 5 further including the steps of detecting whether suction is applied to the suction means and halting the ejection of steam whenever the suction pressure is below a predetermined level.

7. A method for removing bound asbestos-containing materials from substrates, said method comprising the following steps:
   directing at least one stream of low pressure steam to penetrate asbestos-containing material sufficiently to loosen binders in the material so that the material can be easily dislodged from a substrate;
   then, directing a controlled stream of higher pressure heated fluid against the asbestos-containing material for dislodging the material from the substrate; and
   by suction, drawing-in asbestos particles and fibers entrained by the higher pressure fluid that is directed onto the asbestos-containing material.

8. A method according to claim 7 including the step of adding a wetting agent to the steam to assist in penetrating the asbestos-containing material and binder.

9. A method according to claim 7 including the step of ceasing the ejection of steam and higher pressure heated fluid whenever there is a loss of the suction provided by the vacuum source.

10. A method for removing bound asbestos-containing materials from substrates, said method comprising the steps of:
    directing at least one stream of pressurized heated fluid to penetrate asbestos-containing material sufficiently to loosen binders in the material so that the material can be easily dislodged from a substrate to which said substrate is bound;
    by suction, drawing asbestos particles and fibers entrained by the pressurized heated fluid into a suction inlet means and ejecting a portion of the pressurized heated fluid directly into the suction inlet to assist the suction to prevent clogging of the suction inlet means.

* * * * *